United States Patent
Tiitola

(10) Patent No.: US 10,671,811 B2
(45) Date of Patent: Jun. 2, 2020

(54) TEXT EDITING

(71) Applicant: Conversant Wireless Licensing S.a r.l., Luxembourg (LU)

(72) Inventor: Johanna Maria Tiitola, Espoo (FI)

(73) Assignee: Conversant Wireless Licensing S.a r.l., Luxembourg (LU)

( * ) Notice: Subject to any disclaimer, the term of this patent is extended or adjusted under 35 U.S.C. 154(b) by 124 days.

(21) Appl. No.: 15/782,958

(22) Filed: Oct. 13, 2017

(65) Prior Publication Data

US 2018/0032502 A1 Feb. 1, 2018

Related U.S. Application Data

(63) Continuation of application No. 12/432,952, filed on Apr. 30, 2009, now Pat. No. 9,836,448.

(51) Int. Cl.
*G06F 17/27* (2006.01)
*G06F 40/274* (2020.01)

(52) U.S. Cl.
CPC ................... *G06F 40/274* (2020.01)

(58) Field of Classification Search
CPC ...... G06F 17/27; G06F 17/20; G06F 17/2705; G06F 17/271; G06F 17/2715; G06F 17/272; G06F 17/2725; G06F 17/273; G06F 17/2735; G06F 17/274; G06F 17/2745; G06F 17/275; G06F 17/2755; G06F 17/276; G06F 17/2765; G06F 17/277; G06F 17/2775; G06F 17/278; G06F 17/2785; G06F 17/2795
USPC .......... 704/1, 9, 10; 715/255, 256, 259, 261; 707/737
See application file for complete search history.

(56) References Cited

U.S. PATENT DOCUMENTS 5,844,561 A * 12/1998 Tanimoto .............. G06F 3/0488 715/703
6,393,416 B1 * 5/2002 Atkin .................. G06F 17/2735
6,845,369 B1 * 1/2005 Rodenburg ........... G06F 16/338
(Continued)

OTHER PUBLICATIONS http://www.adaptxt.com, "Adaptxt® Download Predictive Text 2.0 for your Smart Phone", True Prediction & Intelligent Error Correction, Version 2.5, Retrieved on Apr. 27, 2011.

*Primary Examiner* — Lamont M Spooner
(74) *Attorney, Agent, or Firm* — Conversant Wireless Licensing

(57) ABSTRACT

An apparatus is provided with an ambiguous keystroke disambiguation and/or word autocompletion text editor application that uses a common language dictionary. The apparatus is also provided with one or more lexica that contain a vocabulary relating to a specific subject matter. The ambiguous keystroke disambiguation and/or word autocompletion text editor application uses one or more of the lexica in combination with a language dictionary for ambiguous keystroke disambiguation and/or word autocompletion text editing. The user can determine which of the lexica are to be used by the ambiguous keystroke disambiguation and/or word autocompletion text editor application. The user can also determine the priority with which the lexica are used. The lexica can be downloaded to the apparatus from the Internet or transferred from any other device that the apparatus is connected to and the lexica that are stored on the apparatus can be edited by a user.

17 Claims, 9 Drawing Sheets

(56) References Cited

U.S. PATENT DOCUMENTS

| | | | | |
|---|---|---|---|---|
| 7,030,863 B2* | 4/2006 | Longe | G06F 3/0237 345/172 |
| 7,912,706 B2* | 3/2011 | Sparre | G06F 17/276 704/10 |
| 8,169,409 B2* | 5/2012 | Castagnet | G06F 3/0237 345/168 |
| 2002/0077808 A1* | 6/2002 | Liu | G06F 3/0237 704/10 |
| 2003/0007018 A1* | 1/2003 | Seni | G06F 3/0237 715/864 |
| 2003/0172063 A1* | 9/2003 | Gutta | G06F 16/954 |
| 2003/0225569 A1* | 12/2003 | Shimamura | G06F 17/2836 704/2 |
| 2004/0021691 A1* | 2/2004 | Dostie | G06F 3/0237 715/773 |
| 2004/0181391 A1* | 9/2004 | Inoue | G10L 15/063 704/10 |
| 2004/0210435 A1* | 10/2004 | Oshima | G06F 17/2735 704/10 |
| 2005/0283468 A1* | 12/2005 | Kamvar | G06F 16/3325 |
| 2007/0074131 A1* | 3/2007 | Assadollahi | G06F 3/0237 715/816 |
| 2007/0076862 A1* | 4/2007 | Chatterjee | G06F 17/276 379/433.06 |
| 2008/0168366 A1* | 7/2008 | Kocienda | G06F 3/0237 715/764 |
| 2008/0263097 A1* | 10/2008 | Manson | H04W 4/02 |
| 2009/0049020 A1* | 2/2009 | Im | G06F 16/36 |
| 2009/0055732 A1* | 2/2009 | Motaparti | G06F 3/0237 715/261 |
| 2009/0089666 A1* | 4/2009 | White | G06F 3/0237 715/257 |
| 2009/0119581 A1* | 5/2009 | Velusamy | G06F 17/276 715/256 |
| 2009/0170536 A1* | 7/2009 | Rang | G06F 3/0237 455/466 |
| 2009/0282037 A1* | 11/2009 | Choi | G06F 17/2735 |
| 2010/0114887 A1* | 5/2010 | Conway | G06F 3/0237 707/737 |
| 2010/0153880 A1* | 6/2010 | Dinn | G06F 3/0236 715/816 |
| 2010/0153881 A1* | 6/2010 | Dinn | G06F 3/0237 715/825 |
| 2010/0280821 A1 | 11/2010 | Tiitola | |

* cited by examiner

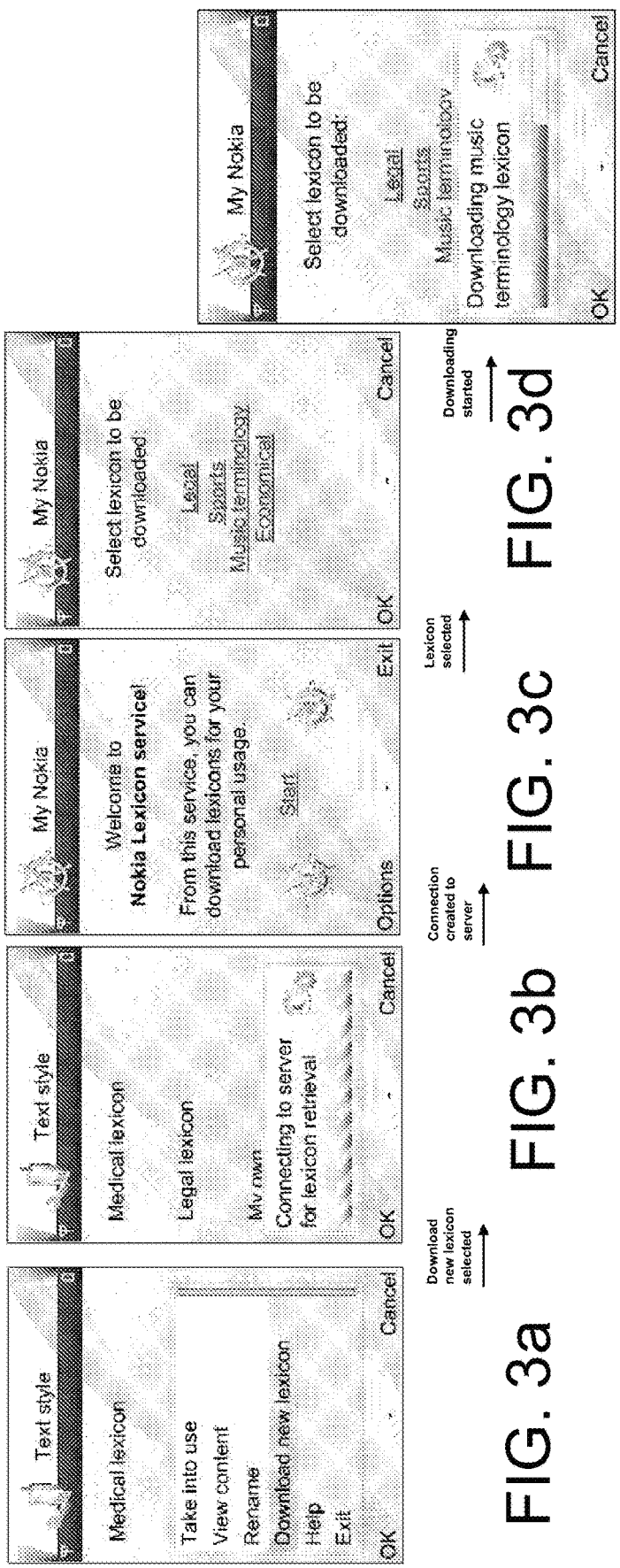

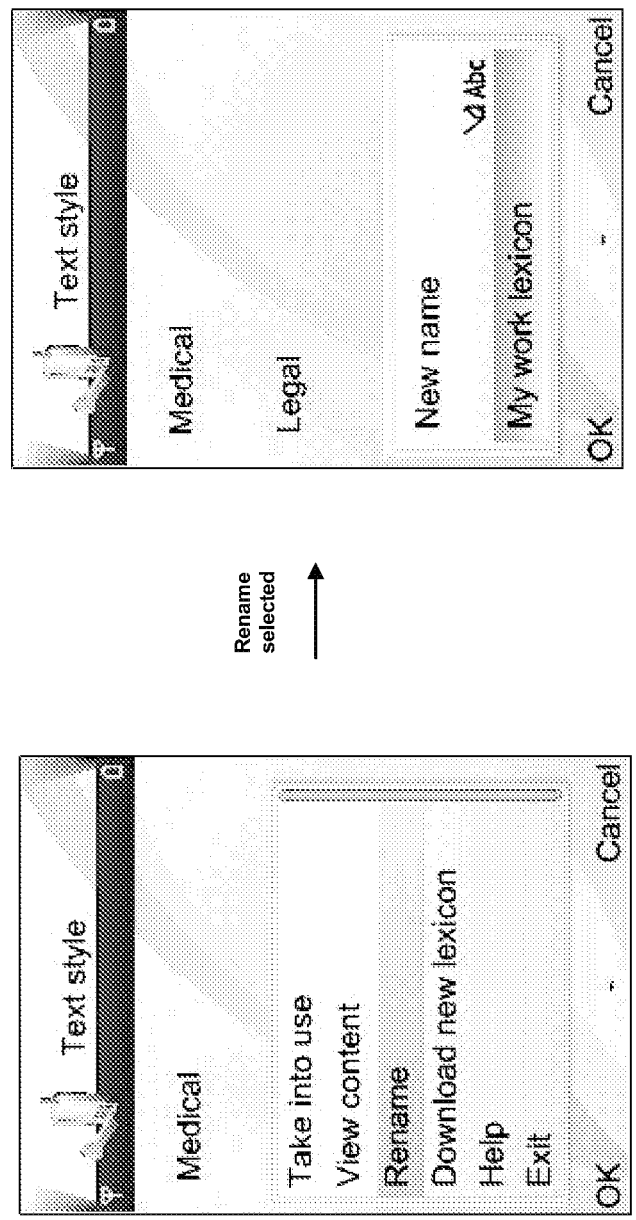

TEXT EDITING

CROSS-REFERENCE TO RELATED APPLICATIONS

This application is a continuation of U.S. patent application Ser. No. 12/432,951 filed on Apr. 30, 2009. The above-identified application is herein incorporated by reference in its entirety.

FIELD

The present application relates a method for ambiguous keystroke disambiguation and/or word autocompletion text editing, in particular to the dictionary and vocabulary that are used for ambiguous keystroke disambiguation and/or word autocompletion text editing. The application also relates to an apparatus with an ambiguous keystroke disambiguation and/or word autocompletion text editing application and to a computer readable medium including computer program code for ambiguous keystroke disambiguation and/or word autocompletion text editing.

BACKGROUND

Contemporary Text Input or Text editing methods enable error correction and automatic word completion as the user types text. In these existing systems, the dictionary is divided between the common language-specific dictionary and the user's own dictionary. The common dictionary contains words that belong to the used display text language. The user's own dictionary contains words that the user currently uses (e.g. proper names, nicknames, used foreign words etc.). The user dictionary learns the most commonly used words automatically. The bigger the usage frequency is, the more the word is offered to the user.

However, these known systems do not sufficiently take human behavior into account. Personal differences in writing style are partly handled by the learning user dictionary. It takes time to teach the dictionary to learn the apparatus user's personal style during use of an ambiguous keystroke disambiguation and/or word autocompletion text editor application. Further, present systems do not use context sensitive writing style. The same person may use different styles in different situations and depending on the target audience of the text. Tautology in writing in certain style is another aspect that is not taken into account. In general users do not use a large variety of words, but tend to repeat certain words.

SUMMARY

On this background, it would be advantageous to provide an apparatus with an ambiguous keystroke disambiguation and/or word autocompletion text editor application, a method and a computer readable medium that overcome or at least reduce the drawbacks indicated above.

This can be achieved by providing a method for ambiguous keystroke disambiguation and/or word autocompletion text editing on an apparatus with an ambiguous keystroke disambiguation and/or word autocompletion text editing application that includes using a language dictionary in combination with one or more lexica.

An apparatus is provided with an ambiguous keystroke disambiguation and/or word autocompletion text editor application that uses a common language dictionary. The apparatus is also provided with one or more lexica that contain a vocabulary relating to a specific subject matter. The ambiguous keystroke disambiguation and/or word autocompletion text editor application uses one or more of the lexica in combination with a language dictionary for ambiguous keystroke disambiguation and/or word autocompletion text editing. The user can determine which of the lexica are to be used by the ambiguous keystroke disambiguation and/or word autocompletion text editor application. The user can also determine the priority with which the lexica are used. The lexica can be downloaded to the apparatus from the Internet or transferred from any other device that the apparatus is connected to and the lexica that are stored on the apparatus can be edited by a user.

Further advantages, features, advantages and properties of the method, apparatus and computer readable medium will become apparent from the detailed description.

BRIEF DESCRIPTION OF THE DRAWINGS

In the following detailed portion of the present description, the teachings of the present document will be explained in more detail with reference to the exemplary embodiments shown in the drawings, in which.

DETAILED DESCRIPTION

In the following detailed description, the apparatus, the method and the software product according to the teachings of this application in the form of a cellular/mobile phone will be described by the exemplary embodiments. It should be noted that although only a mobile phone is described the teachings of this application can also be used in any electronic apparatus such as in portable electronic devices such as laptops, Personal Digital Assistants (PDA), mobile communication terminals, electronic books and notepads and other electronic devices allowing text input.

Figure 1:
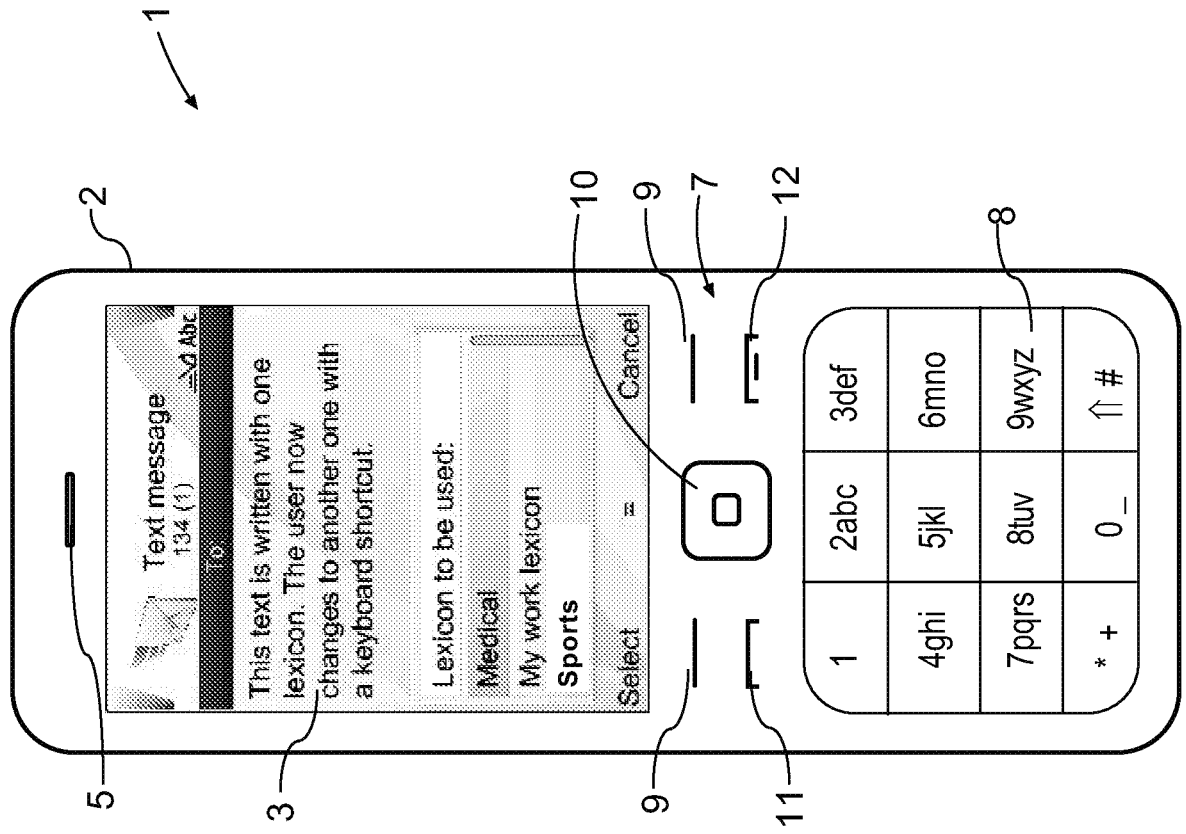
FIG. 1 is a plane front view of an apparatus according to an exemplary embodiment.

FIG. 1 illustrates an exemplary embodiment of an apparatus according to the teaching of this document in the form of a mobile telephone 1 by a front view. The mobile phone 1 comprises a user interface having a housing 2, a display 3, an on/off button (not shown), a speaker 5 (only the opening is shown), and a microphone 6 (not visible in FIG. 1). The phone 1 according to the first preferred embodiment is adapted for communication via a cellular network, such as the GSM 900/1800 MHz network, but could just as well be adapted for use with a Code Division Multiple Access (CDMA) network, a 3G network, or a TCP/IP-based network to cover a possible VoIP-network (e.g. via WLAN, WIMAX or similar) or a mix of VoIP and Cellular such as UMA (Universal Mobile Access).

The keypad 7 has a first group of keys 8 as alphanumeric keys, by means of which the user can enter a telephone number, write a text message (SMS), write a name (associated with the phone number), etc. Each of the twelve alphanumeric keys 8 is provided with a figure "0-9" or a sign "#" or "s", respectively. In alpha mode each key is associated with a number of letters and special signs used in the text editing.

The keypad 7 has additionally a second group of keys comprising two softkeys 9, two call handling keys (offhook key 10 and onhook key 12), a navigation plus select key 11 for e.g. scrolling. The function of the softkeys 9 depends on the state of the phone, and navigation in the menu is performed by using navigation key 11. The present function of the softkeys 9 is shown in separate fields (soft labels) in a dedicated area of the display 3, just above the softkeys 9. The two call handling keys 11, 12 are used for establishing a call or a conference call, terminating a call or rejecting an incoming call.

Figure 2:
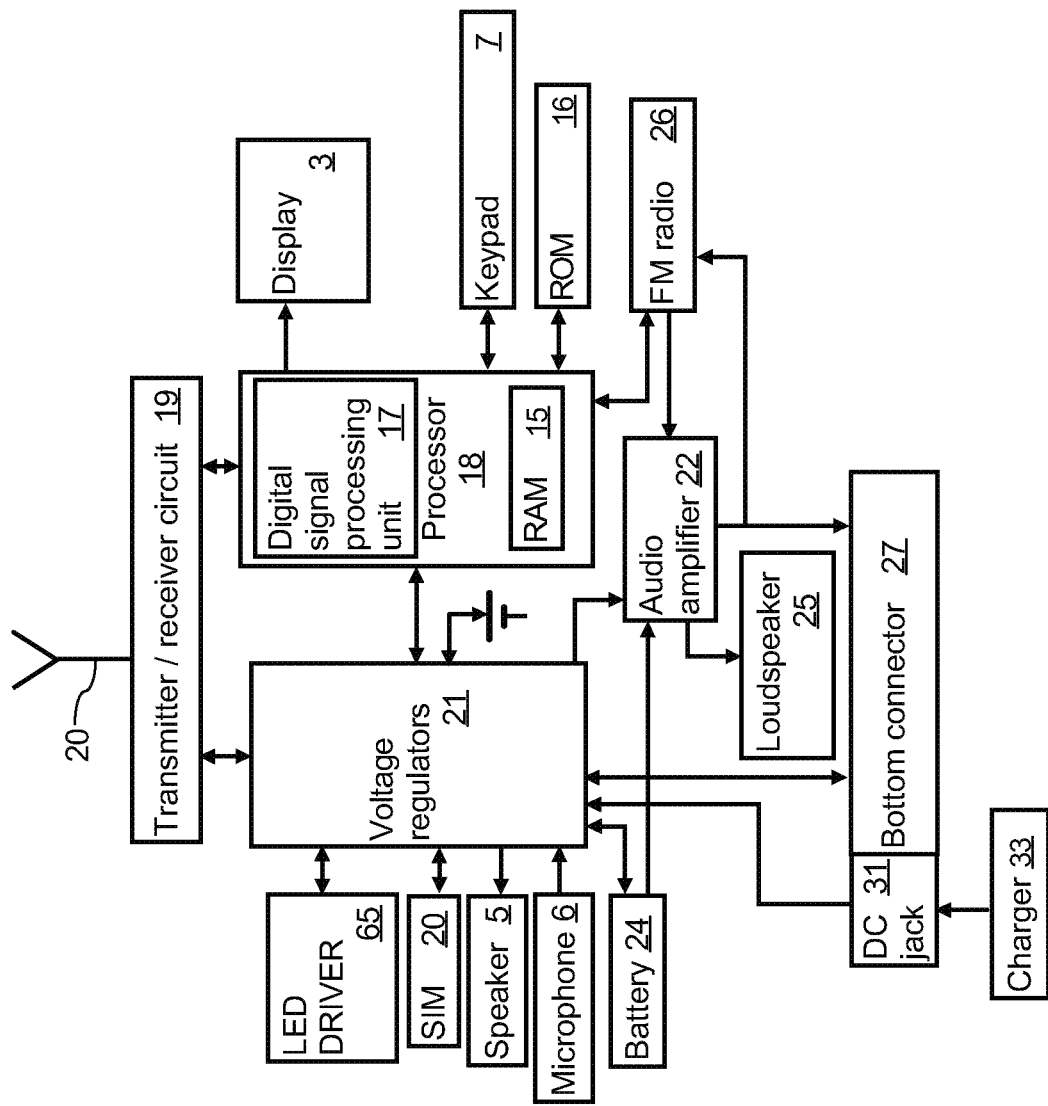
FIG. 2 is a block diagram illustrating the general architecture of the apparatus of FIG. 1, FIGS. 3*a*-3*e* are screenshots of the display of the apparatus of FIG. 1, FIGS. 4*a*-4*d* are screenshots of the display of the apparatus of FIG. 1, FIGS. 5*a*-5*c* are screenshots of the display of the apparatus of FIG. 1, FIGS. 6*a* and 6*b* are screenshots of the display of the apparatus of FIG. 1.

FIG. 2 illustrates in block diagram form the general architecture of a mobile phone 1 constructed in accordance with the teaching of the present document. The processor 18 controls the operation of the terminal and has an integrated digital signal processor 17 and an integrated Random Access Memory (RAM) 15. The processor 18 controls the communication with the cellular network via the transmitter/receiver circuit 19 and an internal antenna 20. A microphone 6 coupled to the processor 18 via voltage regulators 21 transforms the user's speech into analogue signals, the analogue signals formed thereby are converted from analogue to digital in an analog/digital (A/D) converter (not shown) before the speech is encoded in the Digital Signal Processor (DSP) 17 that is included in the processor 18. The encoded speech signal is transferred to the processor 18, which e.g. supports the Global Systeme Mobile (GSM) terminal software. The digital signal-processing unit 17 speech-decodes the signal, which is transferred from the processor 18 to the speaker 5 via a Digital/Analogue (D/A) converter (not shown).

The voltage regulators 21 form the interface for the speaker 5, the microphone 6, the Light-Emitting Diode (LED) drivers 65 (for the LEDS backlighting the keypad 7 and the display 3, and in some embodiments below the touchpad), the Subscriber Identity Module (SIM) card 20, battery 24, the bottom connector 27, the power jack 31 (for connecting to the charger 33) and the audio amplifier 22 that drives the (hands-free) loudspeaker 25.

The processor 18 also forms the interface for some of the peripheral units of the apparatus, including a Flash Read-Only Memory (ROM) memory 16, the graphical display 3, the keypad 7, and a Frequency Modulation (FM) radio 26.

The mobile phone 1 is provided with an ambiguous keystroke disambiguation and/or word autocompletion text editing program that assists a user during text editing, for example when creating a text message, an e-mail, text in a text box, notes, etc. The ambiguous keystroke disambiguation and/or word autocompletion text editing program may include disambiguation of ambiguous keystrokes from keys that have a plurality of characters associated therewith, and/or word autocompletion, typing correction and/or number candidates. Text editing applications that can disambiguate ambiguous keystrokes are well known in the art and will as such not be described in detail here. In the user interface of many existing mobile phones the disambiguation process is referred to as "predictive editing" or simply "prediction".

The problems associated with known ambiguous keystroke disambiguation and/or word autocompletion text editing applications are illustrated by the following imaginary example of three messages written by same person.

Writing to a doctor colleague:

"At the moment of arriving in hospital, the patient had diabetes mellitus cum ketoacidosis. Blood glucose 50.2 mmol/L."

Writing to personal bank assistant:

"What's the status of DowJones and Nikkei? Wall Street up or down?"

Writing to boyfriend:

"Love you honey! C U tonite? Smthg special in mind :-) ? XXX"

Prior art systems will have difficulty providing optimum intelligent support for handling the diverse writing styles in the example above.

In order to suggest the best matching word candidates, the existing text editing applications have access to a language dictionary stored on the phone 1. The text editing application has access to a language dictionary stored on the phone 1. The language dictionary includes a general vocabulary of a particular natural language, such as for example English. This vocabulary is typically designed to include the most common words that are used, but will not cover for example jargon or any other specific field of terminology. Typically, a plurality of language dictionaries is stored on the apparatus, so that ambiguous keystroke disambiguation and/or word autocompletion-text editing can be performed in various natural languages. The user can select the language dictionary to be used via the user interface.

In an embodiment the phone 1 is also provided with at a user dictionary (stored in a memory). The user dictionary contains words such as names that the user adds during use.

The phone 1 is also provided with at least one lexicon (stored in a memory). A lexicon contains vocabulary relating to a specific subject matter, e.g. similar to a jargon. Examples of such specific subject matter are professional areas such as legal, medical, economical and engineering. Other examples of specific subject matter are music terminology (not necessarily related to a specific natural language), Information Technology (IT), sports, religion and art. These lexica can be pre-stored in the mobile phone 1 or downloaded to the mobile phone 1 from a lexicon server via the internet. They can also be accessed at a remote lexicon server via the internet or other connection. Further, the lexica could be transferred from any other apparatus, such as a PC or from another mobile phone.

The phone is provided with an editor application that can disambiguate keystrokes and autocomplete words by using a common language dictionary (and possibly a user dictionary) in combination with a lexicon or several lexica. Hereto, the editor application uses in itself known algorithms for disambiguation and/or autocompletion to provide one or more word candidates. The editor application may also determine the order of the word candidates. The editor application can use the common dictionary, user dictionary and the lexica with different priorities to the dictionaries and lexica.

FIG. 3*a* is a screenshot illustrating a user interface relating to the ambiguous keystroke disambiguation and/or word autocompletion text editing application. The present screenshot is related to a medical lexicon. In this screenshot the user interface allows the user to select various functions relating to the ambiguous keystroke disambiguation and/or word autocompletion text editing application, such as take the lexicon concerned into use, view the content of the lexicon, rename the lexicon, download a new lexicon (via a link possibly to the internet), ask for further help and exit the menu level.

By way of illustration the user selects "Download new lexicon" and the display 3 shows in FIG. 3b that the phone 1 is busy connecting to the lexicon download server. In FIG. 3c the mobile phone 1 has connected to the website of a lexicon download server, which in this example is called the "Nokia lexicon service". After selecting the "Start" link the phone 1 connects to the webpage shown in FIG. 3d that allows the selection of a lexicon to be downloaded. In this example there are four different lexica to choose from: "Legal", "Sport", "Music terminology" and "Economical". When the user selects one of the lexica (in this example the user chooses the "music terminology" lexicon) the download starts and the screen shot of FIG. 3e shows to the user that the download of the selected lexicon is in progress.

Figure 4C:
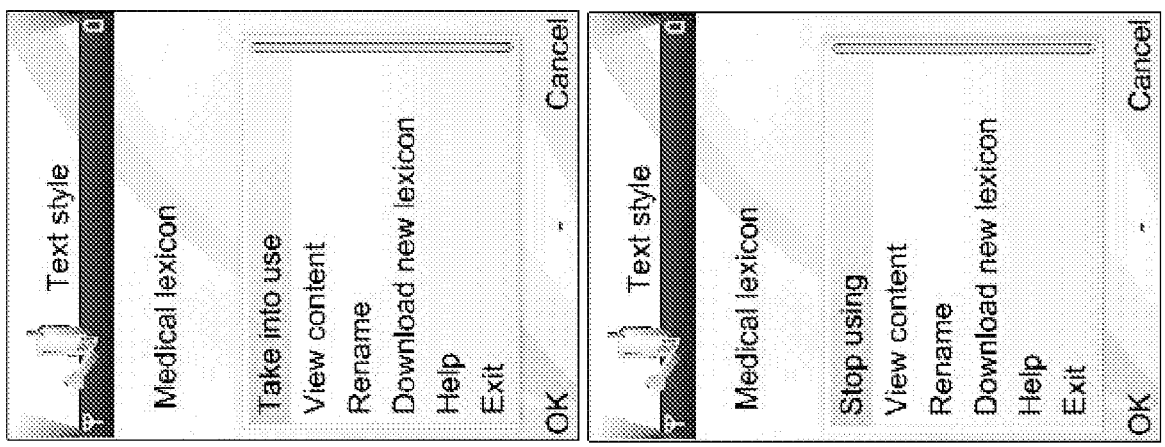
Figure 4B:
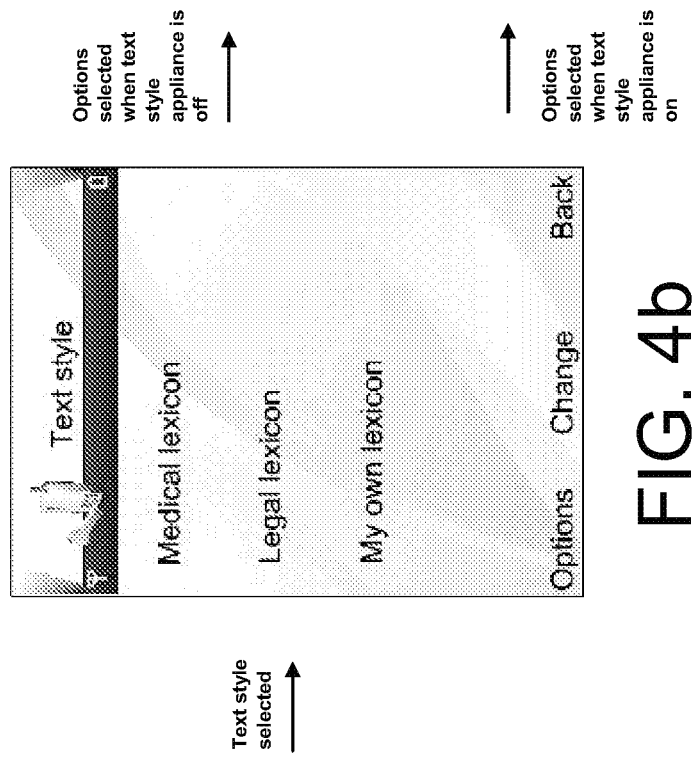
Figure 4D:
Figure 4A:
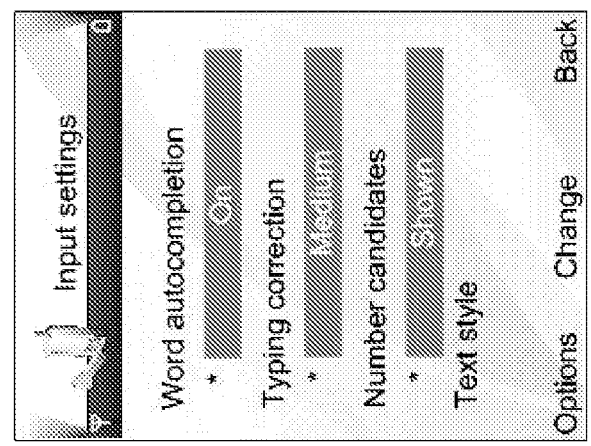

FIG. 4a is these screenshots showing the input settings menu item of the ambiguous keystroke disambiguation and/or word autocompletion editing application. Along other features, such as turning on and off the automatic word completion feature, selecting the level of typing correction, activation and deactivation of number candidates, the start screen of the input settings menu allows the user to select the desired text style.

FIG. 4b is a screenshot of a text style menu level of the ambiguous keystroke disambiguation and/or word autocompletion editor application. In this menu level the user can select the lexicon to be used. When the user selects "Options" when the text style function (or appliance) is off the phone 1 changes to the menu level shown in FIG. 4c. In this menu level the user can take the lexicon concerned into use, view the content, rename it, download a new lexicon, get help or exit the menu level. When the user selects "Options" when the text input function is active, the mobile phone 1 shows the menu level shown in FIG. 4d. Here, the user is given the option to stop using the lexicon concerned or view the content or rename it or download a new lexicon, get help or exit the menu level.

Figure 5C:
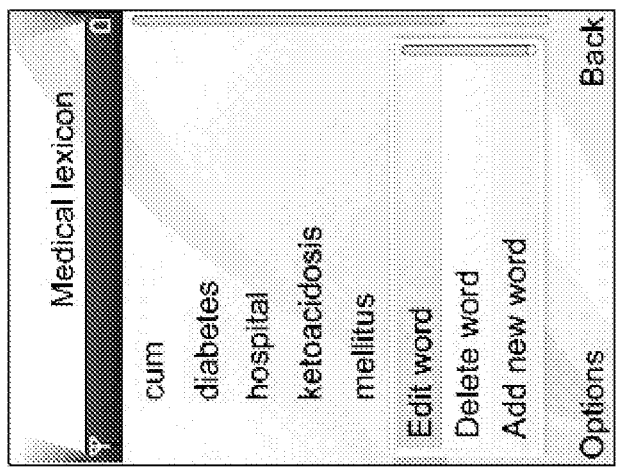
Figure 5B:
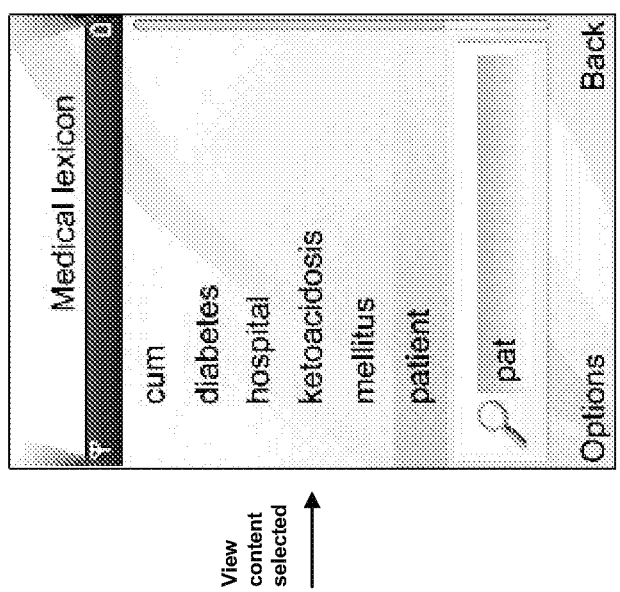
Figure 5A:
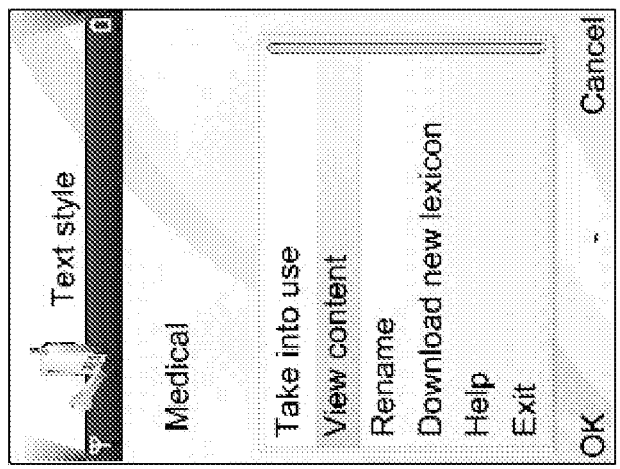

Following the menu level of FIG. 4d the user selects in FIG. 5a the function "View content" and thereafter arrives at the menu level shown in FIG. 5b. In the menu level of FIG. 5b the content of the lexicon concerned (as in this case the medical lexicon) is listed and can be searched by entering a search string in the text box. When the user has highlighted the desired word and presses the left function key "Options" the display shows the functions "Edit word", "Delete word", and "Add new word". Under the respective functions the user can edit the selected word, delete the selected word, or add a new word.

Following the menu level of FIG. 4d the user highlights in FIG. 6a the function "Rename" and after pressing "OK" arrives at the menu level shown in FIG. 6b. In the menu level of FIG. 6b the user has entered a new name for the lexicon concerned.

The ambiguous keystroke disambiguation and/or word autocompletion text editor application is configured with a keyboard shortcut for selecting (or swapping) a lexicon or changing the priority of the active lexica. Thus, the swap could be to a new "primary lexicon". The usage of a particular lexicon does not necessarily exclude the usage of other ones, and in an embodiment the selection may show which one of the lexica has the highest priority in word candidate offering order. An example of such a keyboard shortcut is pressing one of the alphanumerical keys for a prolonged period of time, or a combination of two keys pressed simultaneously, before, during or after text editing.

Figure 7:
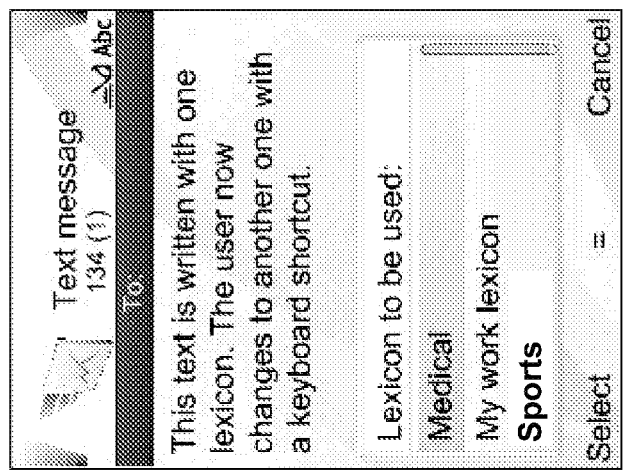
FIG. 7 is a screenshot of the display of the apparatus of FIG. 1.

As shown in FIG. 7, activating such a shortcut during text editing causes a lexicon selection menu to pop up with in the text editor application during the creation of a message. Via this pop-up menu in the user can change lexicon or change lexicon priority in the middle of the process of creating/editing a message. Thus, the user can swap quickly between writing styles.

The ambiguous keystroke disambiguation and/or word autocompletion text editing application allows a plurality of lexica to be used simultaneously, i.e. combination of several text styles. The lexica can be used in combination with equal priority (all lexica having the same priority) or with the lexica can be used in combination having different individual priorities.

Figure 8:
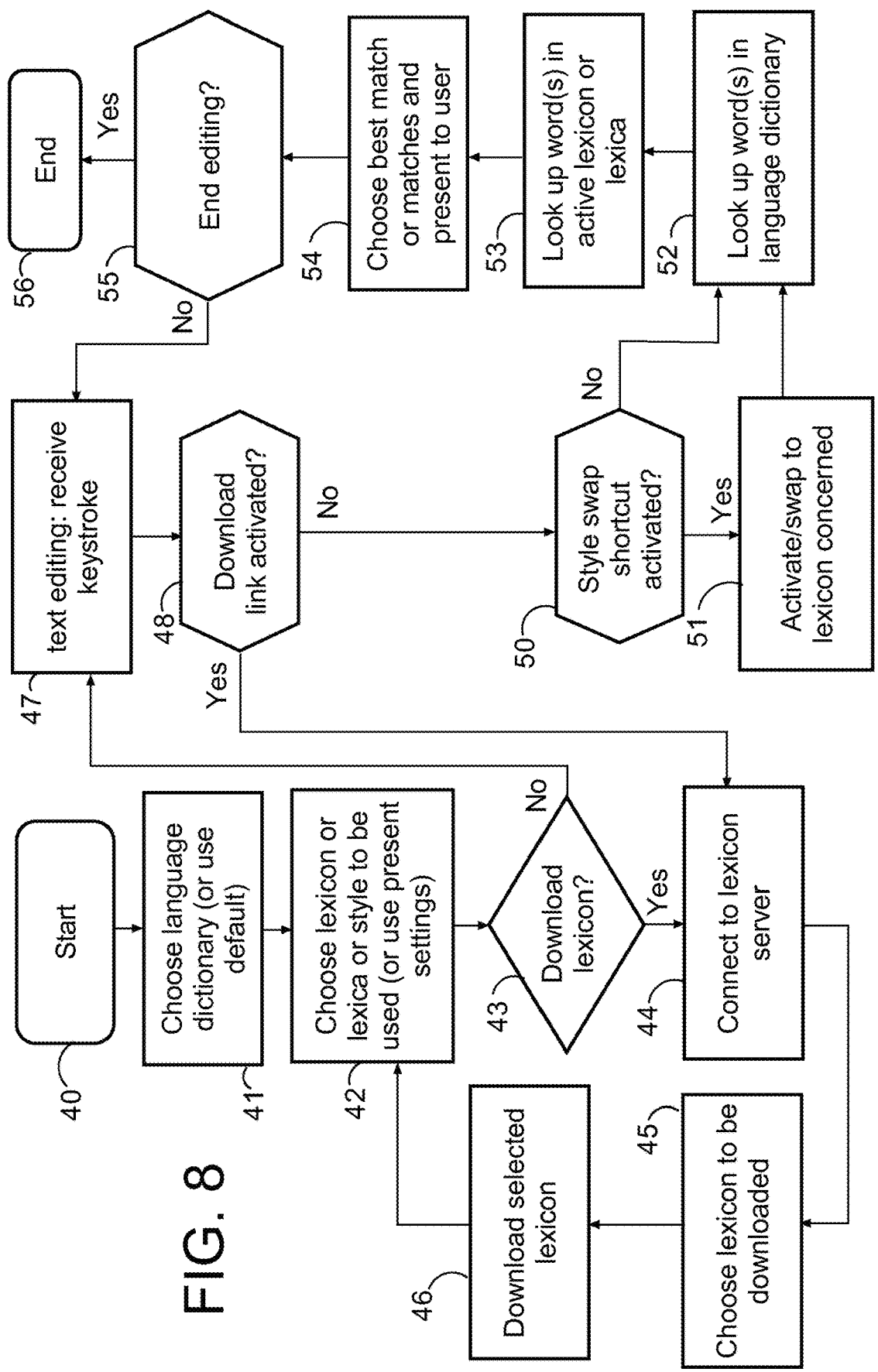
FIG. 8 is a flowchart illustrating an exemplary embodiment of the application.

FIG. 8 is a flowchart illustrating an exemplary embodiment of the application. In box 40 the ambiguous keystroke disambiguation and/or word autocompletion editing starts.

The user can choose a language for the text editing or stay with the default or previously selected language in box 41. In box 42 user can choose a lexicon or lexicon or style to be used or use the present settings.

In box 43 the user is given the opportunity to download a lexicon. If the user decides to download a lexicon the apparatus will connect to a lexicon server in box 44. Next, the user will be offered to choose a lexicon to be downloaded in box 45. In box 46 the selected lexicon is downloaded and stored in the device. Thereafter, the process returns to box 42.

When the user does not decide to download a lexicon in box 43 the process moves to box 47 (when a user starts a new message or other text to be written the apparatus 1 will start the text editing process at step 47 without bothering the user with the choices to be made in boxes 41 to 46 and text editing will being with the default settings for the language and lexica to be used). In box 47 the text editor application awaits keystrokes from the user for editing a text. When a keystroke or entry is received (e.g. by touch on a touchscreen) the process moves to box 48 in which the text editing application checks whether a download link has been activated. If the user has indeed activated the download link the process will move to box 44 and will eventually return to box 48, as described above. If the download link has not been activated the process moves to box 50.

In box 50 the text editing application verifies whether a file swap shortcut has been activated by the user. If a file swap shortcut has been activated the process moves to box 51 in which the user is given the opportunity to swap the presently active style with another style. If the style swap shortcut has not been activated the process moves to box 52 in which the editing application looks up a word in the language dictionary. The looking up of a word or words in the language dictionary on the basis of the entered key string, e.g. for ambiguous keystroke disambiguation or for word completion is as such well known and will not be described in detail here.

In box 53 the text editing application will look up a word or words in the active lexicon or lexica. On the basis of the results in box is 52 and 53 the text editing application chooses the best match or matches in box 54 and presents the match or matches (i.e. words) to the user. The order in which the candidates are presented is partly defined by the lexicon or lexica in use.

In box 55 the text editing application determines whether the user has ended the text editing process, for example by having sent the message that was being edited. If the user has not ended the text editing process the process moves to box 47 and the text editing process continues as described above.

Figure 9:
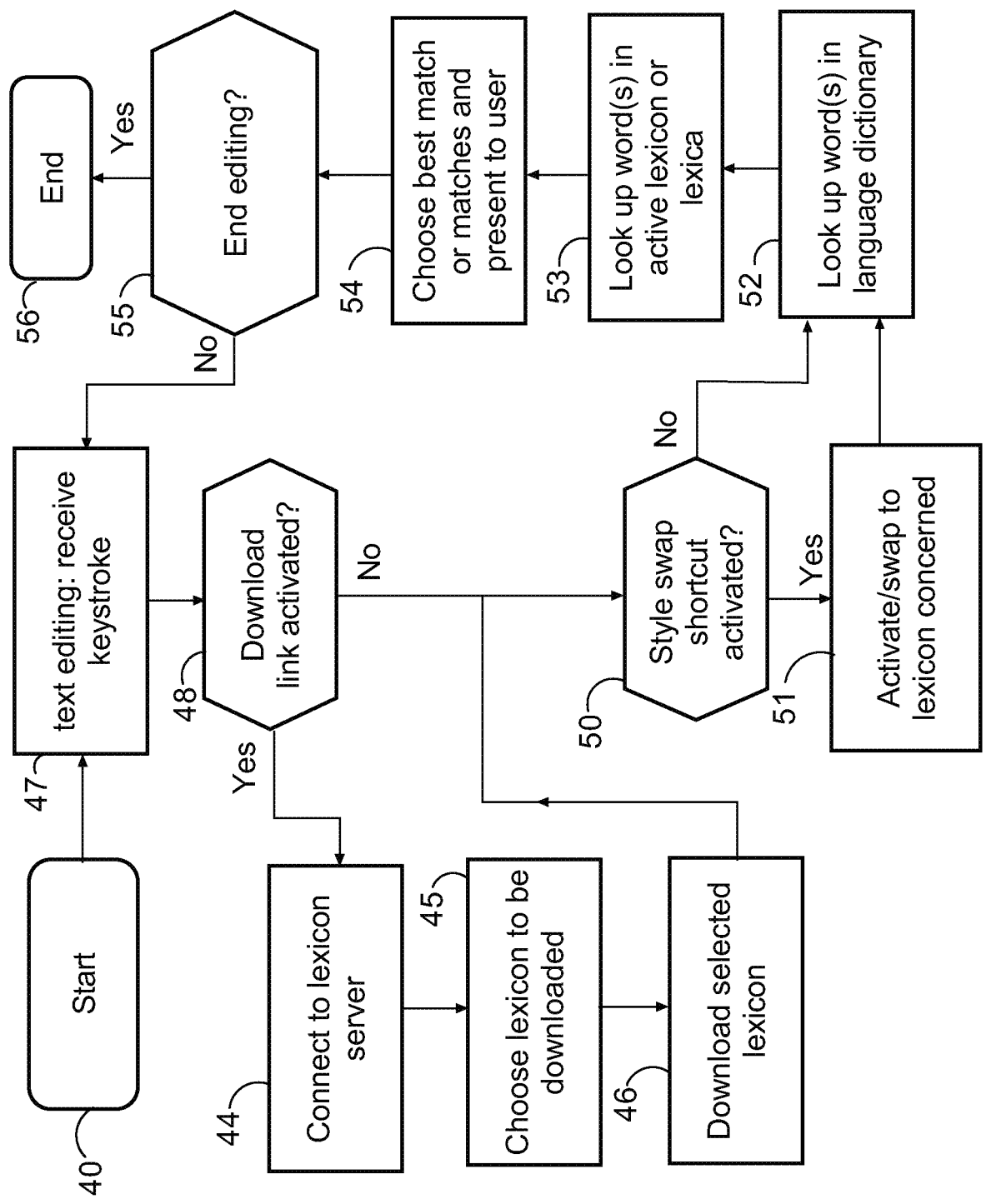
FIG. 9 is another flowchart illustrating an exemplary embodiment of the application.

FIG. 9 is a flowchart illustrating an exemplary embodiment of the application. In box 40 the ambiguous keystroke disambiguation and/or word autocompletion editing starts.

In box 47 the text editor application awaits keystrokes from the user for editing a text. When a keystroke or entry is received (e.g. by touch on a touchscreen) the process moves to box 48 in which the text editing application checks whether a download link has been activated. If the user has indeed activated the download link the process will move to box 44 and will eventually return to box 48, as described above. If the download link has not been activated the process moves to box 50.

In box 50 the text editing application verifies whether a file swap shortcut has been activated by the user. If a file swap shortcut has been activated the process moves to box 51 in which the user is given the opportunity to swap the presently active style with another style. If the style swap shortcut has not been activated the process moves to box 52 in which the editing application looks up a word in the language dictionary. The looking up of a word or words in the language dictionary on the basis of the entered key string, e.g. for ambiguous keystroke disambiguation or for word completion is as such well known and will not be described in detail here.

In box 53 the text editing application will look up a word or words in the active lexicon or lexica. On the basis of the results in box is 52 and 53 the text editing application chooses the best match or matches in box 54 and presents the match or matches (i.e. words) to the user. The order in which the candidates are presented is partly defined by the lexicon or lexica in use.

In box 55 the text editing application determines whether the user has ended the text editing process, for example by having sent the message that was being edited. If the user has not ended the text editing process the process moves to box 47 and the ambiguous keystroke disambiguation and/or word autocompletion text editing process continues as described above.

If the user has indeed ended the ambiguous keystroke disambiguation and/or word autocompletion text editing process, the process moves to box 56 and the process ends.

The various aspects of the teaching of the present document described above can be used alone or in various combinations. The teaching of the present document is preferably implemented by a combination of hardware and software, but can also be implemented in hardware or software.

The teaching of this document has numerous advantages. Different embodiments or implementations may yield one or more of the following advantages. It should be noted that this is not an exhaustive list and there may be other advantages which are not described herein. One advantage of the teaching of this document is that the text editing speed increases. It is another advantage of the teaching of this document that prediction candidates are given in better frequency order, as the probability of getting the wanted word right away increases. It is another advantage of the teaching of this document that automatic word completion can be used more efficiently. It is another advantage of the teaching of this document that the correct word candidate can be proposed at an early phase of writing, even after only a couple of keystrokes. It is another advantage of the teaching of this document that text editing becomes more comfortable. This is important especially because devices become smaller and keyboards have more restrictions. Further, there is a tendency in the field towards touch user interface. Text editing with touch devices is not as comfortable as with devices with hard keyboards, and therefore improvements to ambiguous keystroke disambiguation and/or word autocompletion text editing even greater benefits in touch input devices.

Although the teaching in this document has been described in detail for purpose of illustration, it is understood that such detail is solely for that purpose, and variations can be made therein by those skilled in the art without departing from the scope of the teaching.

For example, although the teaching has been described in terms of a hand portable apparatus such as a mobile phone, it should be appreciated that the teaching may also be applied to other types of electronic devices, such as still or motion cameras, video recorders, media players, palmtop computers, navigation apparatus and the like. Also, although the teaching has been described in with reference to an apparatus with a hard keyed keypad, the teaching can be used with any other form of text input arrangement, such as for example a hard full qwerty keyboard, a hard half-qwerty keyboard, a virtual ITU-T keyboard, a virtual full qwerty keyboard or a virtual half-qwerty keyboard.

Features described in the preceding description may be used in combinations other than the combinations explicitly described.

Whilst endeavouring in the foregoing specification to draw attention to those features of the teaching of the present document believed to be of particular importance it should be understood that the Applicant claims protection in respect of any patentable feature or combination of features hereinbefore referred to and/or shown in the drawings whether or not particular emphasis has been placed thereon.

The term "comprising" as used in the claims does not exclude other elements or steps. The term "a" or "an" as used in the claims does not exclude a plurality. The single processor or other unit may fulfill the functions of several means recited in the claims.

The invention claimed is:

1. A method for text editing on an electronic device having a processor and display, the method comprising:
   in response to a user input, selecting one of a plurality of common language dictionaries;
   then receiving user input corresponding to at least one keystroke at the electronic device during text entry in a text editing program;
   disambiguating ambiguous keystrokes from the user input at least based on simultaneous use of the selected common language dictionary and a first subject matter lexicon with a highest priority among a plurality of subject matter lexica comprising at least one subject matter lexicon related to a professional area;
   then, in response to a user input indicating a change in priority among the subject matter lexica, displaying a lexicon selection menu while displaying text previously entered within the text editing program;
   receiving a selection by the user of the electronic device of a second subject matter lexicon from the displayed lexicon selection menu;
   disambiguating the ambiguous keystrokes from the user input at least based on simultaneous use of the selected common language dictionary and the second subject matter lexicon; and
   displaying at least one disambiguation result.

2. The method according to claim 1, wherein at least the lexicon corresponding to a professional area includes medical terminology.

3. The method according to claim 1, wherein the common language dictionary includes English vocabulary.

4. The method according to claim 1, further comprising downloading at least one of the first subject matter lexicon and the second subject matter lexicon from a lexicon server.

5. The method according to claim 1, further comprising providing a download link that can be activated during text editing, the download link pointing to a lexicon server.

6. The method according to claim 1, further comprising receiving a user selection of at least one input setting relating to display of a result of disambiguation of user input, wherein the displaying at least one disambiguation result to the user of the electronic device is according to the at least one input setting.

7. The method according to claim 1, wherein the disambiguating of ambiguous keystrokes is also based on simultaneous use of a user dictionary comprising names.

8. An electronic apparatus comprising:
a display;
a user interface;
a processor; and
a memory including computer program code, the memory and the computer program code configured to, with the processor, cause the apparatus at least to:
in response to a user input from the user interface, select one of a plurality of common language dictionaries stored in memory;
receive user input corresponding to at least one keystroke from the user interface during text entry in a text editing program;
disambiguate ambiguous keystrokes from the user input at least based on simultaneous use of the selected common language dictionary and a first subject matter lexicon with a highest priority among a plurality of subject matter lexica comprising at least one lexicon related to a professional area;
then, in response to a user input indicating a change in priority among the subject matter lexica, display a lexicon selection menu while displaying text previously entered within the text editing program;
receive a selection by the user of the electronic apparatus of a second subject matter lexicon from the lexicon selection menu;
disambiguate the ambiguous keystrokes from the user input at least based on simultaneous use of the selected common language dictionary and the second subject matter lexicon; and
display at least one disambiguation result.

9. The apparatus according to claim 8, wherein the memory and the computer program code are further configured to access a server for downloading at least one of the first subject matter lexicon and the second subject matter lexicon.

10. The apparatus according to claim 8, wherein the memory and the computer program code are further configured to provide a download link pointing to a lexicon server.

11. The apparatus according to claim 8, wherein the memory and the computer program code are configured to disambiguate ambiguous keystrokes also based on simultaneous use of a user dictionary comprising names.

12. The apparatus according to claim 8, wherein the memory and the computer program code are further configured to receive a user selection of at least one input setting relating to display of a result of disambiguation of user input, wherein the display of the at least one disambiguation result to the user of the electronic apparatus is according to the at least one input setting.

13. A non-transitory computer-readable storage medium carrying one or more sequences of one or more instructions which, when executed by one or more processors, cause an apparatus to at least perform:
in response to a user input, select one of a plurality of common language dictionaries;
responsive to user input corresponding to at least one keystroke received at the apparatus during text entry in a text editing program, disambiguate ambiguous keystrokes from the user input at least based on simultaneous use of the selected common language dictionary and a first subject matter lexicon with a highest priority, wherein the first selected subject matter lexicon is related to a first particular professional area;
then, in response to a user input indicating a change in priority among the subject matter lexica, display a lexicon selection menu while displaying text previously entered within the text editing program;
receive a selection by the user of the apparatus of a second subject matter lexicon from the lexicon selection menu;
disambiguate the ambiguous keystrokes from the user input at least based on simultaneous use of the selected common language dictionary and the second subject matter lexicon; and
display at least one disambiguation result.

14. The non-transitory computer readable storage medium of claim 13, further configured to cause the apparatus to access a server for downloading at least one of the first subject matter lexicon and the second subject matter lexicon.

15. The non-transitory computer readable storage medium of claim 13, further configured to cause the apparatus to provide a download link pointing to a lexicon server.

16. The non-transitory computer-readable storage medium according to claim 13, wherein the one or more sequences of one or more instructions further include instructions that, when executed by the one or more processors, cause the apparatus to receive a user selection of at least one input setting relating to the display of the at least one disambiguation result, wherein the display of the at least one disambiguation result to the user of the electronic apparatus is according to the at least one input setting.

17. The non-transitory computer-readable storage medium according to claim 13, wherein the one or more sequences of one or more instructions include instructions that, when executed by the one or more processors, cause the apparatus to disambiguate ambiguous keystrokes also based on simultaneous use of a user dictionary comprising names.

* * * * *